(12) United States Patent
Baba et al.

(10) Patent No.: US 9,153,963 B2
(45) Date of Patent: Oct. 6, 2015

(54) ELECTRIC POWER CONTROL APPARATUS AND GRID CONNECTION SYSTEM HAVING SAME

(75) Inventors: Akira Baba, Osaka (JP); Kiyotaka Takehara, Nara (JP); Akiko Takamiya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 283 days.

(21) Appl. No.: 13/695,939

(22) PCT Filed: May 11, 2011

(86) PCT No.: PCT/IB2011/000999
§ 371 (c)(1),
(2), (4) Date: Nov. 2, 2012

(87) PCT Pub. No.: WO2011/141798
PCT Pub. Date: Nov. 17, 2011

(65) Prior Publication Data
US 2013/0049695 A1    Feb. 28, 2013

(30) Foreign Application Priority Data

May 11, 2010  (JP) ................. 2010-109562

(51) Int. Cl.
*H02J 7/00* (2006.01)
*H02J 3/12* (2006.01)
*H02J 3/32* (2006.01)
*H02J 3/38* (2006.01)
*H02J 3/14* (2006.01)

(52) U.S. Cl.
CPC ... *H02J 3/12* (2013.01); *H02J 3/32* (2013.01); *H02J 3/383* (2013.01); *H02J 2003/146* (2013.01); *Y02E 10/563* (2013.01); *Y02E 10/566* (2013.01); *Y02E 70/30* (2013.01)

(58) Field of Classification Search
CPC ....................................................... Y02E 60/12
USPC ............................................................ 320/128
See application file for complete search history.

(56) References Cited

U.S. PATENT DOCUMENTS 5,548,200 A * 8/1996 Nor et al. ..................... 320/109
6,104,160 A * 8/2000 Iwata et al. ................... 320/103

(Continued)

FOREIGN PATENT DOCUMENTS

CN        1313650       9/2001
CN      101557115     10/2009
JP       H6-133472      5/1994

(Continued)

OTHER PUBLICATIONS

Chinese Office Action dated May 28, 2014 issued in a corresponding Chinese application No. 201180023449.4 and the English search report thereof.
International Search Report for corresponding International Application No. PCT/IB2011/000999 mailed Oct. 18, 2011.
Form PCT/ISA/237 for corresponding International Application No. PCT/IB2011/000999 dated Oct. 18, 2011.

*Primary Examiner* — Yalkew Fantu
(74) *Attorney, Agent, or Firm* — Renner, Otto, Boisselle & Sklar, LLP

(57) ABSTRACT

An electric power control apparatus enables a surplus electric power from a distributed power source to be stored in a storage battery in a consumer unit provided with a distributed power source and a storage battery. The electric power control apparatus is characterized in being provided with a compensation calculating unit which calculates the compensation of electric power by using a unit price of electricity for sale when charging the storage battery and a unit price of electricity for purchase when discharging from the storage battery.

7 Claims, 8 Drawing Sheets

(56) References Cited

U.S. PATENT DOCUMENTS

| | | |
|---|---|---|
| 6,323,620 B1 | 11/2001 | Miyoshi et al. |
| 6,680,547 B1 * | 1/2004 | Dailey ............................. 307/31 |
| 7,256,516 B2 * | 8/2007 | Buchanan et al. .............. 307/62 |
| 2007/0221422 A1 * | 9/2007 | Rosenstock .................. 180/65.3 |
| 2009/0133733 A1 * | 5/2009 | Retti ............................ 136/206 |

FOREIGN PATENT DOCUMENTS

| | | |
|---|---|---|
| JP | 2003-189477 | 7/2003 |
| JP | 2005-133472 | 5/2005 |
| JP | 4266003 | 2/2009 |
| JP | 2009-268247 | 11/2009 |
| JP | 2010-213468 | 9/2010 |

* cited by examiner

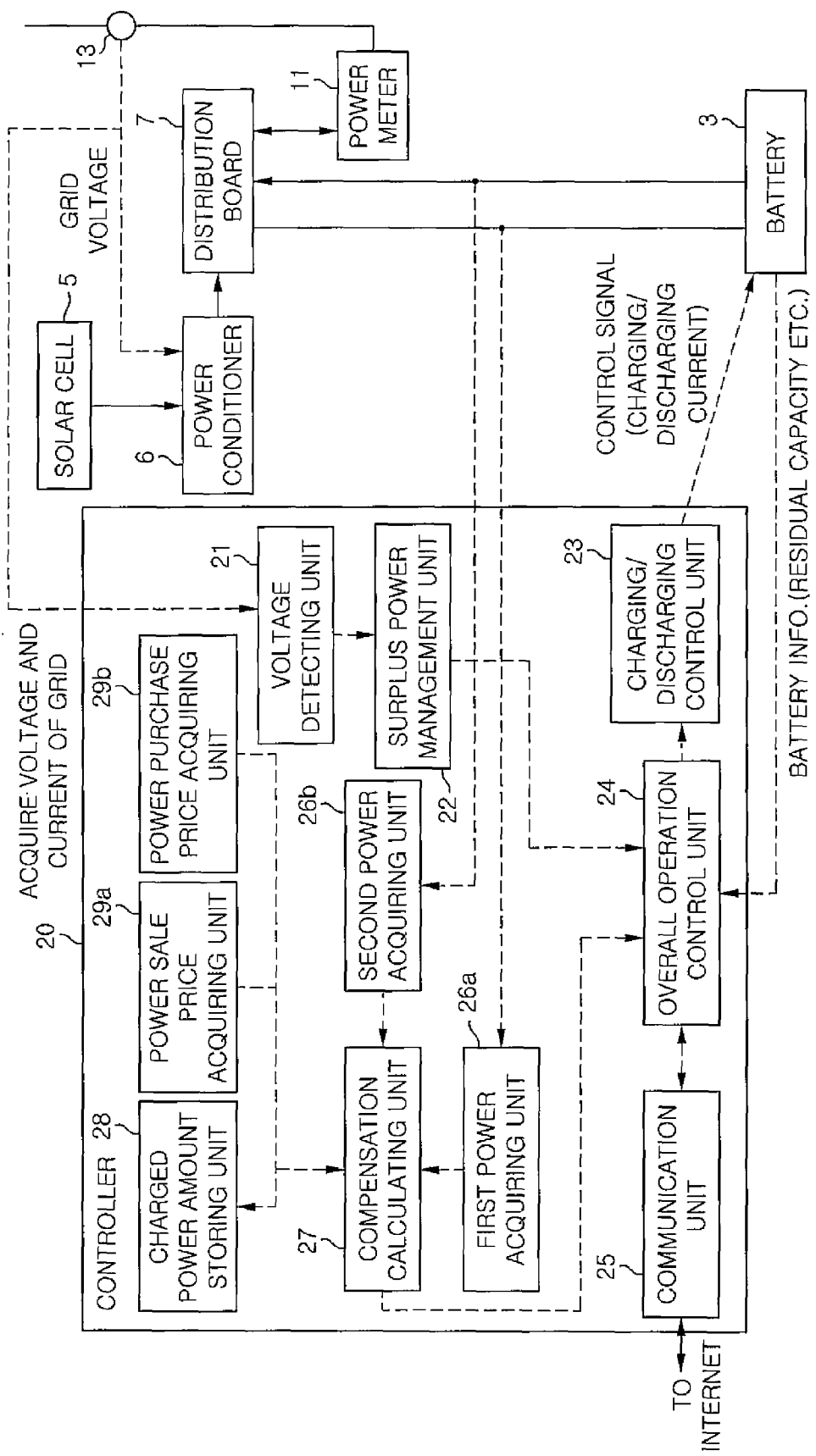

ELECTRIC POWER CONTROL APPARATUS AND GRID CONNECTION SYSTEM HAVING SAME

FIELD OF THE INVENTION

The present invention relates to an electric power control apparatus for controlling the connection of an electrical grid of a commercial power source and a distributed power source of a consumer dwelling, and a grid connection system provided with the same.

BACKGROUND OF THE INVENTION

In recent years, power generation devices such as a photovoltaic power generation device, a fuel cell, a wind power generation device and a cogeneration device are used in power consumer dwellings such as houses, factories and the like. In addition, there is practically available a grid connection system in which power generation devices are connected to an electrical grid of a commercial power source and to be used as distributed power sources. In the grid connection system, if the electricity power generated by the distributed power sources cannot be entirely consumed in a consumer dwelling, the surplus electric power is allowed to be reversely fed to an electrical grid of a commercial power source. In a case where the electric power is reversely fed to the electrical grid, it is sometimes possible to receive compensation corresponding to the amount of the reversely-fed electric power from a power supplier that supplies electric power as a commercial power source.

However, if the reverse power feeding is performed in the event that the distributed power sources are connected to the electrical grid, a voltage rise, a frequency change and a phase advance in the electrical grid may possibly occur. In particular, these kinds of phenomena easily occur when the number of distributed power sources connected to an electrical grid sharing a pole transformer with the distributed power sources gets increased. Moreover, the voltage of the electrical grid is more likely to rise as the distance from the pole transformer to the distributed power sources grows longer.

In order to avoid the aforementioned problem posed when the distributed power sources are connected to the electrical grid, it is obligated to provide a function by which output control is performed as the voltage of the electrical grid rises during the reverse power feeding. There is proposed a technique in which a voltage triggering output control is set higher as the distance from a pole transformer to distributed power sources grows longer (see, e.g., Japanese Patent No. 4266003 (JP4266003B).

The aforementioned phenomena are monitored by the distributed power sources. If the phenomena occur more heavily than a specified degree, the reverse power feeding from the distributed power sources to the electrical grid is restrained to thereby reduce the influence on the electrical grid. In the technique disclosed in JP4266003B, the voltage triggering output control is set differently depending on the distance from the pole transformer to the distributed power sources so that the opportunities for the distributed power sources to perform the reverse power feeding to the electrical grid can be impartially distributed to the respective distributed power sources. In other words, the opportunities for the distributed power sources to sell a surplus power can be impartially allotted to the distributed power sources regardless of the distance from the pole transformer to the distributed power sources.

In the technique disclosed in JP4266003B, threshold values are set at the voltage triggering output control. The threshold values are adjusted depending on the impedance from the pole transformer to the distributed power sources, thereby reducing the imbalance in the opportunities for the reverse power feeding to the electrical grid. Therefore, if the number of distributed power sources connected to the secondary side of the pole transformer grows larger in a crowded area of houses, the difference between the threshold values which are set with respect to the adjoining distributed power sources becomes smaller. This requires high accuracy in setting the threshold values.

In order to set the threshold values stated above, it is necessary to calculate the impedance between the pole transformer and the distributed power sources connected to the secondary side of the pole transformer. For that reason, when installing the distributed power sources, it is necessary to acquire the information on the topology of distribution networks, the distance of wiring lines and the kind of wiring lines. It is also necessary to acquire the information on the specifications of the distributed power sources. In other words, there is a need to manage an increase amount of information. This leads to an increase in data management costs.

As set forth above, the technique disclosed in JP4266003B poses a problem in that it cannot be implemented under the condition that the number of the distributed power sources connected to the secondary side of the pole transformer is large and the distances between the adjoining distributed power sources and the electric circuit of the electrical grid are short.

If the control for restraining the reverse power feeding is performed depending on the circumstances of the electrical grid as stated above, the reverse power feeding to the electrical grid cannot be carried out even when surplus power is generated in a consumer dwelling. In other words, the consumer dwelling cannot receive compensation resulting from the reverse power feeding and, therefore, may suffer from an economic loss. As a result, the recovery period of the capital invested in installation of the distributed power sources is prolonged and the cost-effectiveness is reduced. This is one of causes weakening the motivation to adopt the distributed power source.

The reason for performing the output control of the distributed power source is that electric power is reversely fed from the distributed power source to the electrical grid. Therefore, it appears that the problem attributable to the output control of the distributed power source can be solved by reducing the reverse power feeding from the distributed power source to the electrical grid. As a technique for reducing the reverse power feeding from the distributed power source to the electrical grid, Japanese Patent Application Publication No. 2009-268247 (JP2009-268247A) discloses a method of using a battery in combination with a distributed power source. In the technique disclosed in JP2009-268247A, the moving average of the electric power amount in the past reverse power feeding is used as a target value of the electric power amount to be subjected to the reverse power feeding, thereby reducing the peak value per unit time of the electric power amount when performing the reverse power feeding.

The use of the technique disclosed in JP2009-268247A makes it possible for the battery to store the electric power not to be subjected to the reverse power feeding. This reduces the economic loss suffered by a consumer dwelling, as compared with a case where the output control of the distributed power source is performed.

However, there occurs an economic loss corresponding to the difference between the unit power price at the time of performing the reverse power feeding to the electrical grid and the power purchase price at the time of discharging and using the charged electric power. Now, it is assumed that the unit power price in case of reversely feeding electric power to the electrical grid is 48 yen/kWh and further that the unit power price in case of receiving electric power from the electrical grid is 28 yen/kWh. In that case, a profit of 48 yen per kWh is generated if the reverse power feeding is performed. Therefore, if the expense of 28 yen is subtracted from 48 yen, the actual profit becomes 20 yen. In the configuration of JP2009-268247A, the electric power of the battery storing the electric power generated in the distributed power source is discharged and used. For that reason, the expense of 28 yen per kWh becomes unnecessary. Since, however, the reverse power feeding is not performed, no profit is generated. Therefore, as compared with a case where the reverse power feeding is performed, a loss of 20 yen per kWh is incurred.

JP2009-268247A describes that the electric power amount reversely fed to the electrical grid is measured and the value obtained by equally allotting the measured electric power amount to the distributed power sources of all the consumers is regarded as an upper limit value when each of the consumers performs the reverse power feeding. However, there exists a difference in the electric power generated by the respective distributed power sources. In addition, the consumer dwellings consume different amounts of electric power. This means that there exists a difference in the surplus powers of the respective consumer dwellings. For that reason, if the measured electric power amount is equally allotted to the distributed power sources, the consumer dwelling having a larger amount of surplus power suffers a greater loss.

SUMMARY OF THE INVENTION

In view of the above, the present invention provides an electric power control apparatus capable of reducing an economic loss suffered by a consumer dwelling, enabling a plurality of consumer dwellings to impartially sell electric power and reducing the output control of a distributed power source to thereby operate the distributed power source with high efficiency.

In accordance with an aspect of the present invention, there is provided with an electric power control apparatus for use in a consumer dwelling provided with a distributed power source and a battery. The apparatus configured to enable a surplus power generated by the distributed power source to be charged in the battery. The apparatus includes: a compensation calculating unit configured to calculate compensation by using a power sale price available when an electric power is charged in the battery and a power purchase price available when the electric power is discharged from the battery.

The apparatus further includes: a voltage detecting unit configured to monitor a voltage of an electrical grid of a commercial power source; a surplus power management unit configured to select a state in which surplus power is reversely fed to the electrical grid when the voltage of the electrical grid monitored by the voltage detecting unit is equal to or lower than a specified threshold value and to select a state in which the surplus power is not reversely fed to the electrical grid but is charged in the battery when the voltage of the electrical grid monitored by the voltage detecting unit is higher than the specified threshold value, in a case where the surplus power is generated in the distributed power source; a first power acquiring unit configured to acquire an electric power amount generated from the distributed power source and charged in the battery; a second power acquiring unit configured to acquire an electric power amount discharged from the battery; a power sale price acquiring unit configured to acquire a power sale price available when electric power is fed to the electrical grid; and a power purchase price acquiring unit configured to acquire a power purchase price available when an electric power is received from the electrical grid.

The compensation calculating unit is configured to calculate a loss amount incurred by not reversely feeding the surplus power while the surplus power management unit selects the state in which the surplus power is charged in the battery, as a money amount equivalent to compensation for reverse power feeding, by using the electric power amount acquired by the first power acquiring unit during a period in which the voltage of the electrical grid monitored by the voltage detecting unit is higher than the specified threshold value, the power sale price acquired by the power sale price acquiring unit when the electric power is charged in the battery, the electric power amount acquired by the second power acquiring unit and the power purchase price acquired by the power purchase price acquiring unit when the electric power is discharged from the battery.

The compensation calculating unit may be configured to calculate the compensation by using a difference between the power sale price available when electric power is charged in the battery and the power purchase price available when electric power is discharged from the battery, as a unit price of the electric power discharged from the battery.

The compensation calculating unit is preferably configured to calculate compensation for an electric power amount discharged from the battery, if the power sale price available when electric power is charged in the battery is higher than the power purchase price available when electric power is discharged from the battery.

In accordance with another aspect of the present invention there is provided with a grid connection system, including: the electric power control apparatus of any one of claims 2 to 4 provided in each of a plurality of consumer dwellings; and a management server configured to, when surplus powers are generated in two or more of the consumer dwellings, transmit a command for causing battery charging through a wide area network to a surplus power management unit of one of the consumer dwellings which has the smallest residual power amount of a battery.

With the configuration of the present invention, it is possible to prevent loss of the profit obtained by the reverse power feeding and to reduce the economic disadvantage suffered by the consumer dwelling. It is also possible to enable a plurality of consumer dwellings to impartially sell electric power. In addition, if the reverse power feeding cannot be performed, the electric power is charged in the battery. This reduces the output control of the distributed power source, thereby operating the distributed power source with high efficiency.

BRIEF DESCRIPTION OF THE DRAWINGS

The objects and features of the present invention will become apparent from the following description of preferred embodiments given in conjunction with the accompanying drawings.

FIG. 5 is a block diagram of an electric power control apparatus in accordance with another embodiment of the present invention.

DETAILED DESCRIPTION OF THE EMBODIMENTS

Embodiments of the present invention will now be described in detail with reference to the accompanying drawings which form a part hereof. Identical or similar parts throughout the drawings will be designated by like reference symbols and will not be described repeatedly.

Figure 2:
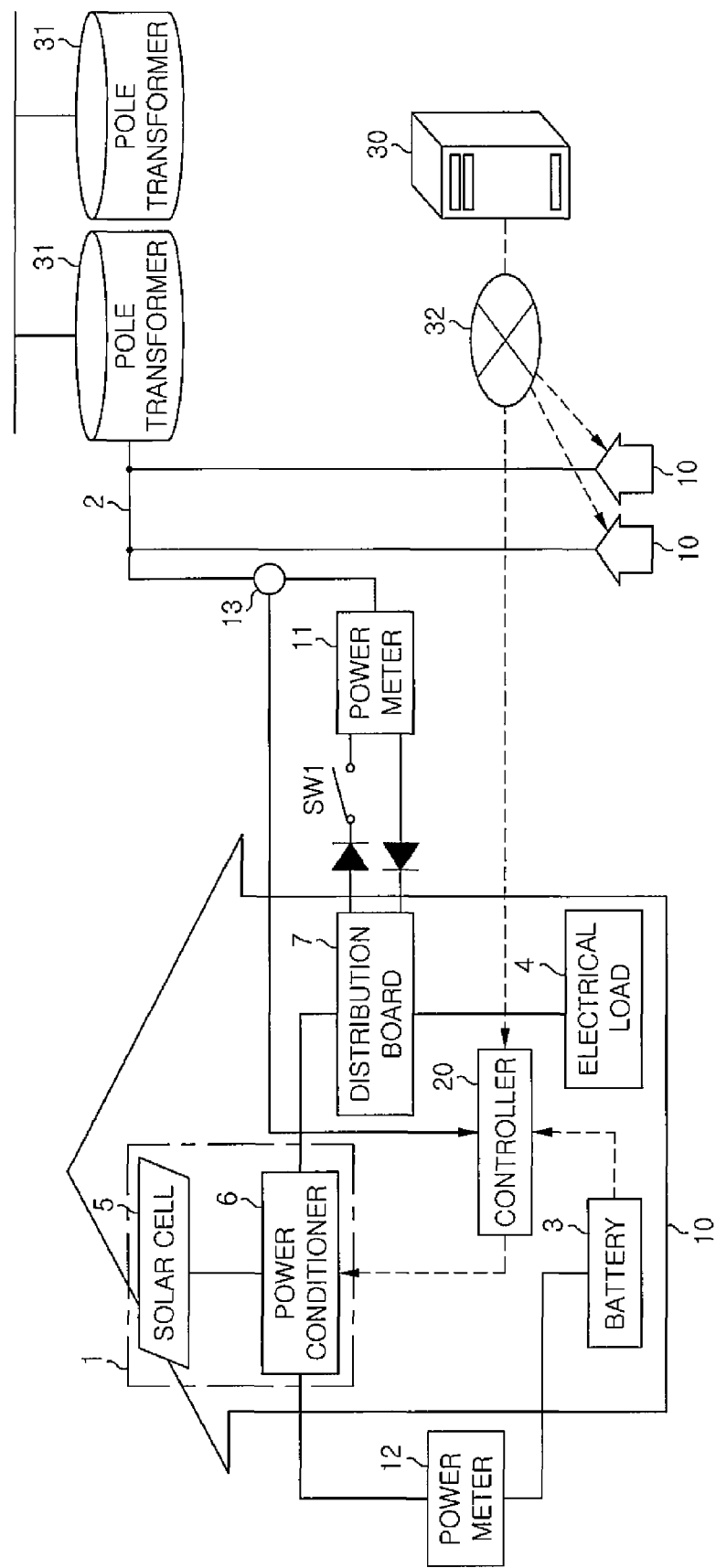
FIG. 2 is a schematic block diagram of a grid connection system in accordance with the embodiment of the present invention.

FIG. 2 shows the schematic configuration of a grid connection system for interconnecting a distributed power source 1 of a consumer dwelling 10 and an electrical grid 2. A battery 3 is provided in the consumer dwelling 10. The battery 3 is provided to store at least a part of the surplus power which is outputted from the distributed power source 1 but cannot be consumed by an electrical load 4. If necessary, the battery 3 supplies the electric power to the electrical load 4. The battery 3 is installed in at least one of the interior or exterior of the consumer dwelling 10.

The consumer dwelling 10 is connected to a secondary side of a pole transformer 31 provided in the electrical grid 2 of a commercial power source (CPS). Commercial electric power is supplied from the secondary side of the pole transformer 31 to a plurality of consumer dwellings 10. In the embodiment described below, it is assumed that a plurality of distributed power sources 1 is connected to the secondary side of a single pole transformer 31 through a distribution board (DB) 7 and an electricity meter 11. In the illustrated example, a controller 20 provided in the consumer dwelling 10 can communicate with a management server 30 through an Internet 32 as a wide area network. The functions of the controller 20 and the management server 30 will be described later.

FIG. 2 shows an example in which a photovoltaic power generation device is used as the distributed power source 1. The photovoltaic power generation device includes a solar cell 5 and a power conditioner 6 for converting a DC voltage outputted from the solar cell 5 to an AC voltage. The power conditioner 6 serves also to control the charging and discharging of the battery 3. The photovoltaic power generation device is one example of the distributed power source 1. A power generation device using recyclable energy, such as a wind power generation device or a small-sized hydroelectric power generation device, a fuel cell and a cogeneration device may be used as the distributed power source 1.

The power conditioner 6 is connected to the distribution board 7 within which the distributed power source 1 and the electrical grid 2 are connected to each other. The electrical load 4 is connected to a breaker (not shown) arranged within the distribution board 7 and is supplied with the output of the power conditioner 6 and the electric power of the commercial power source. In other words, the commercial power source, the battery 3 and the solar cell 5 can be used as power sources of the electrical load 4.

In the consumer dwelling 10, there are provided a first electricity meter 11 for measuring the electric power received from the electrical grid 2 of the commercial power source and the electric power reversely fed to the electrical grid 2 of the commercial power source and a second electricity meter 12 for measuring the charged electric power and the discharged electric power of the battery 3. A voltage sensor 13 for detecting the voltage of the electrical grid 2 is arranged near a power receiving point at which each of the consumer dwellings 10 receives electric power from the electrical grid 2 of the commercial power source. The voltage sensor 13 is used to determine whether or not to reversely feed a surplus power to the electrical grid 2.

In the consumer dwelling 10, there is also provided a controller (electric power control apparatus) 20 for controlling the power conditioner 6 to decide a supply destination of the electric power outputted from the solar cell 5. The supply destinations of the electric power of the solar cell 5 are the electrical load 4 and the electrical grid 2. It is possible to select one of a case where the electric power generated by the solar cell 5 is directly supplied to the supply destinations and a case where the electric power generated by the solar cell 5 is first charged in the battery 3 and then supplied to the supply destinations.

Figure 1:
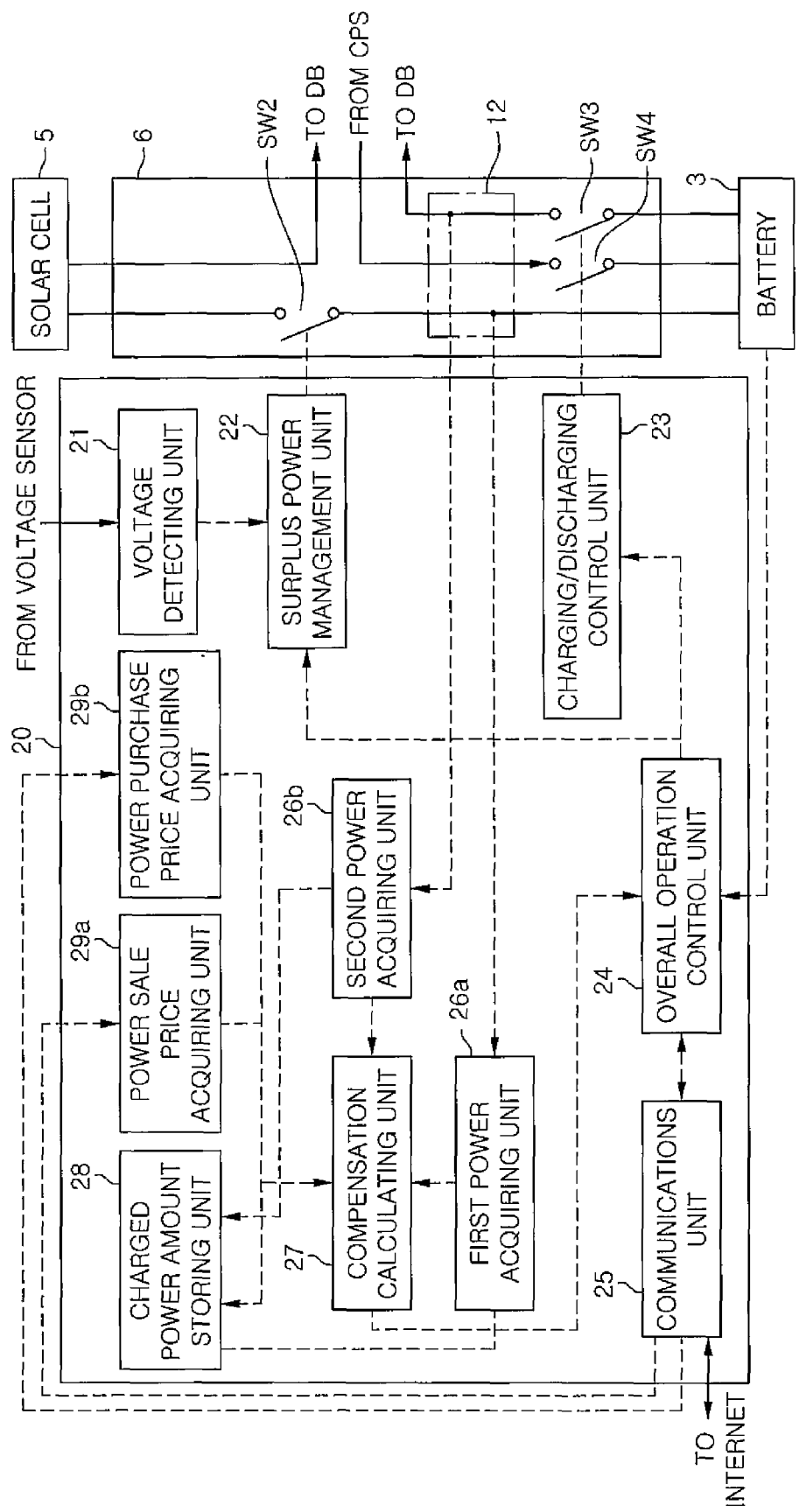
FIG. 1 is a block diagram showing an electric power control apparatus in accordance with an embodiment of the present invention.

As shown in FIG. 1, the power conditioner 6 is provided with a switch SW2 for selecting the battery 3 as the supply destination of the electric power outputted from the solar cell 5. The electric power outputted from the solar cell 5 can be supplied to the electrical load 4 through the distribution board 7. The power conditioner 6 is further provided with a switch SW3 for selecting the supply and non-supply of the electric power of the battery 3 to the distribution board 7. In the illustrated example, a switch SW4 is provided to enable a user to select a state in which the electric power of the commercial power source is charged in the battery 3. However, the switch SW4 is not essential in the present invention and therefore will not be described herein. As shown in FIG. 2, a switch SW1 for selecting the reverse power feeding to the electrical grid 2 is provided between the distribution board 7 and the electricity meter 11.

While a power converter for performing the conversion between DC power and AC power in the power conditioner 6 is not shown in FIG. 1, it is necessary to convert a DC voltage to an AC voltage in the event that the electric power of the battery 3 or the solar cell 5 is supplied to the distribution board 7. It is also necessary to convert an AC voltage to a DC voltage in the event that the electric power of the commercial power source is charged in the battery 3.

In FIG. 1, for the sake of description of a part for monitoring the charging and discharging amounts of the battery 3, the second electricity meter 12 is shown to be disposed within the power conditioner 6. In reality, as shown in FIG. 2, the second electricity meter 12 may be provided separately from the power conditioner 6. The second electricity meter 12 can measure the amount of electric charges charged to or discharged from the battery 3 by merely measuring an electric current. It is however preferable to measure a voltage together with the current, thereby calculating the electric power charged to and discharged from the battery 3.

The controller 20 is configured with a processor for executing programs and a memory. The controller 20 realizes the below-mentioned functions by executing the programs. The controller 20 includes a voltage detecting unit 21 for acquiring the output of the voltage sensor 13 to monitor the voltage of the electrical grid 2. The voltage detecting unit 21 periodically acquires the output of the voltage sensor 13 and converts the acquired voltage to a digital value.

The voltage acquired by the voltage detecting unit 21 is inputted to a surplus power management unit 22. The surplus power management unit 22 turns the switch SW1 on if the voltage of the electrical grid 2 monitored by the voltage detecting unit 21 is equal to or lower than a specified threshold value. Since the switch SW1 is turned on in a state that the electric power generated by the solar cell 5 is supplied to the distribution board 7 through the power conditioner 6, the surplus power generated by the solar cell 5 but not consumed by the electrical load 4 is allowed to be reversely fed to the electrical grid 2.

By turning on the switch SW3, the electric power of the battery 3 is (converted to AC power and then) supplied to the distribution board 7. Thus the electrical load 4 is supplied with not only the electric power generated by the solar cell 5 but also the electric power of the battery 3. Therefore, if the sum of the electric power generated by the solar cell 5 and the electric power outputted from the battery 3 is larger than the electric power consumed by the electrical load 4, the differential electric power as a surplus power is reversely fed to the electrical grid 2. The electric power generated by the solar cell 5 is consumed by the electrical load 4 prior to the electric power of the battery 3. Maximum power point tracking (MPPT) control is performed in the distributed power source 1.

On the other hand, if the voltage of the electrical grid 2 acquired by the voltage detecting unit 21 is higher than the threshold value, the surplus power management unit turns the switch SW1 off and turns the switch SW2 on. Consequently, the electric power generated by the solar cell 5 is not fed to the electrical grid 2 but is charged in the battery 3. In other words, if the voltage of the electrical grid 2 acquired by the voltage detecting unit 21 is higher than the threshold value, it is presumed that another consumer dwelling 10 performs reverse power feeding. In that case, the electric power generated by the solar cell 5 is not reversely fed to the electrical grid 2. Instead, the electric power generated by the solar cell 5 is charged in the battery 3 and is supplied to the electrical load 4.

When the switches SW1 and SW3 remain turned on, the switch SW2 is turned off and the electric power is not charged to the battery 3. If the electric power supplied from the battery 3 and the distributed power source 1 is not large enough to be consumed by the electrical load 4, the electrical load 4 is supplied with electric power from the power conditioner 6 and the electrical grid 2 of the commercial power source.

As set forth above, the on/off operation of the switches SW1 and SW2 is controlled by the surplus power management unit 22. The on/off operation of the switch SW3 (and SW4) is controlled by a charging/discharging control unit 23 provided in the controller 20. The operation of the charging/discharging control unit 23 is instructed by an overall operation control unit 24. Moreover, the overall operation control unit 24 issues an instruction to the surplus power management unit 22.

In other words, the overall operation control unit 24 selects one of an operation of supplying the electric power generated by the solar cell 5 to the distribution board 7, an operation of charging the surplus power in the battery 3 and an operation of supplying the electric power charged in the battery 3 to the electrical load 4. The overall operation control unit 24 is capable of making communications with the management server 30 through a communications unit 25. The overall operation control unit notifies the management server 30 of necessary information and controls the on/off operation of the switches SW1 through SW4 pursuant to the command supplied from the management server 30. The overall operation control unit 24 has a function of acquiring the residual capacity of the battery 3. The battery 3 includes a microcomputer arranged therein and can provide different kinds of information to external devices. In other words, the residual capacity of the battery 3 is measured by the battery 3 itself and is acquired by the overall operation control unit 24.

The controller 20 includes a first power acquiring unit 26a for acquiring the amount of the electric power charged in the battery 3 from the solar cell 5 (the distributed power source 1) and a second power acquiring unit 26b for acquiring the amount of the electric power discharged from the battery 3. The controller 20 further includes a power sale price acquiring unit 29a for acquiring a unit price of the electric power fed (sold) to the electrical grid 2 and a power purchase price acquiring unit 29b for acquiring a unit price of the electric power received (purchased) from the electrical grid 2. The power sale price acquiring unit 29a and the power purchase price acquiring unit 29b need to acquire up-to-date information. It is therefore preferred that the power sale price acquiring unit 29a and the power purchase price acquiring unit 29b acquire information from the management server 30 through the communications unit 25.

The controller 20 includes a charged power amount storing unit 28 for recording the charged power amount acquired by the first power acquiring unit 26a and the unit prices of electric power acquired by the power sale price acquiring unit 29a and the power purchase price acquiring unit 29b. The controller 20 further includes a compensation calculating unit 27 for calculating a money amount equivalent to the compensation payable when the electric power is not charged in the battery 3 but is reversely fed to the electrical grid 2. The compensation calculating unit calculates the money amount by using the charged power amount and the unit prices of electric power recorded in the charged power amount storing unit 28.

The information recorded in the charged power amount storing unit 28 will be described later. The compensation calculating unit 27 calculates, as the money amount equivalent to the compensation for reverse power feeding, the amount of loss incurred by not reversely feeding the surplus power during the time when the surplus power is charged in the battery 3

Now, description will be made on one operation example. Described herein is the operation according to the time course of one day. When the amount of electric power generated by the solar cell 5 is increased as the altitude of the sun grows higher and the voltage of the electrical grid 2 of the commercial power source is equal to or smaller than the threshold value set by the surplus power management unit 22, the power conditioner 6 starts its operation. The AC power outputted from the power conditioner 6 is supplied to the electrical load 4 through the distribution board 7.

If the output power (generated power) of the solar cell 5 is larger than the electric power (load power) consumed in the electrical load 4, the surplus power corresponding to the difference between the generated power and the load power is fed to the electrical grid 2. That is to say, the surplus power is reversely fed to the electrical grid 2. At this time, the first electricity meter 11 measures the amount of the reversely-fed surplus power as a sale power amount.

If the reverse feeding of the surplus power is simultaneously performed by other consumer dwellings 10, it is sometimes the case that the amount of the electric powers reversely fed to the electrical grid 2 becomes larger than the amount of the electric powers received from the secondary side of the pole transformer 31 and consumed by the consumer dwellings 10. If such is the case, the voltage of the electrical grid 2 is increased at the secondary side of the pole transformer 31.

The controller 20 of each of the consumer dwellings 10 monitors the voltage of the electrical grid 2 in the vicinity of the power receiving point of each of the consumer dwellings 10. Thus the controller 20 can detect the increase in the voltage of the electrical grid 2. If the voltage of the electrical grid 2 exceeds the threshold value set by the surplus power management unit 22, the controller 20 turns off the switch SW1 provided between the distribution board 7 and the electricity meter 11 and turns on the switch SW2 provided in the power conditioner 6. Consequently, the surplus power is not reversely fed to the electrical grid 2 but is charged in the battery 3. In this regard, the capacity of the battery 3 is larger than the amount of the surplus power to be charged for one day.

As the altitude of the sun is lowered while not performing the reverse power feeding, the solar cell 5 generates a reduced amount of electric power. If the generated power is smaller than the load power, the controller 20 turns on the switch SW3, thereby causing the battery 3 to discharge the electric power stored therein. The electric power discharged from the battery 3 is equal to the difference between the amounts of the electric power generated by the solar cell 5 and the demanded load power. The sum of the amount of the electric power generated by the solar cell 5 and the amount of the electric power discharged by the battery 3 is controlled to become equal to the demanded load power. During the time when the battery 3 can discharge the electric power, the electric power supplied from the electrical grid 2 is not used in the electrical load 4.

In other words, no electric power is received from the electrical grid 2 and no electric power amount is measured by the first electricity meter 11. In the meantime, the second electricity meter 12 measures the amount of electric power discharged from the battery 3. The electric power charged in the battery 3 is the surplus power generated in the past, which could have been fed to the electrical grid 2 at the time of generation thereof. Therefore, the electric power charged in the battery 3 has an equal value to the electric power that could have been reversely fed to the electrical grid 2.

If the load power demanded by the electrical load 4 exceeds the sum of the electric power generated by the solar cell 5 and the electric power that can be supplied from the battery 3, the electrical load 4 is supplied with electric power from the electrical grid 2. Thus, the received electric power amount is measured by the first electricity meter 11.

As can be noted from the foregoing description, the sum of the amount of electric power fed to the electrical grid 2 and measured by the first electricity meter 11 and the amount of electric power discharged by the battery 3 and measured by the second electricity meter 12 is equivalent to the amount of electric power sold to the electrical grid 2. In addition, the electric power amount received from the electrical grid 2 and measured by the first electricity meter 11 is equivalent to the electric power amount purchased from the electrical grid 2.

In the operation described above, it is assumed that the battery 3 is capable of storing daily surplus power. If the battery 3 is fully charged with the surplus power, the output of the power conditioner 6 is restrained. This operation is the same as the operation described in the Background of the Invention.

If it is assumed that the reverse power feeding to the electrical grid 2 is performed without charging the battery 3, the amount of the surplus power is equal to the amount of the electric power measured by the first electricity meter 11 and the electric power measured by the second electricity meter 12. This is because the first electricity meter 11 measures the reversely-fed surplus power while the second electricity meter 12 measures the electric power equivalent to the reversely-fed electric power. price (yen/kWh) of the electric It is now assumed that the unit price (yen/kWh) of the electric power received from the electrical grid 2 and the unit power fed (reversely fed) to the electrical grid 2 are as shown in Table 1. In Table 1, the act of receiving electric power from the electrical grid 2 is called "power purchase" and the act of feeding electric power to the electrical grid 2 is called "power sale". The power purchase is divided into power purchase at daytime and power purchase at night (e.g., from 23:00 p.m. to 7:00 a.m.).

The unit price of electric power is decided by a contact with a power supplier and is changed depending on the content and time of the contract. For example, the power purchase price may be set at three stages on a time basis. Alternatively, the power purchase price may not be set on a time basis but may be changed depending on the amount of electric power purchased. A change in a unit price of fuel may sometimes affect the power purchase price and a distribution rate of the distributed power sources 1 may sometimes affect the power sale price. For that reason, it is necessary for the power sale price acquiring unit 29a and the power purchase price acquiring unit 29b to acquire a power sale price and a power purchase price.

TABLE 1

| Purchase/Sale | Unit Price (yen/kWh) |
|---|---|
| Power Purchase (at daytime) | 28 |
| Power Purchase (at night) | 10 |
| Power Sale | 48 |

The unit price of the electric power measured by the second electricity meter 12 is equal to the difference between the power purchase price and the power sale price as shown in Table 2. The reason for using the difference between the power purchase price and the power sale price will be described later. The unit price shown in Table 2 is the compensation for the electric power discharged from the battery 3. If this unit price is used, the sum of the compensation payable to the respective consumer dwellings 10 becomes constant regardless of whether the surplus power generated by the solar cell 5 is reversely fed to the electrical grid 2 or charged in the battery 3.

TABLE 2

| | Unit Price (yen/kWh) |
|---|---|
| Daytime | 20 |
| Night | 38 |

If the unit prices of electric power measured by the first electricity meter 11 and the second electricity meter are set as shown in Tables 1 and 2, the compensation calculating unit 27 can calculate the compensation for the purchase and sale of electric power.

Herein, it is assumed that the amount of electric power charged in the battery 3 and the power sale price during the charging time are recorded in a corresponding relationship. For example, it is assumed that the amount of electric power charged in the battery 3 is recorded as shown in Table 3.

TABLE 3

| Power sale price (yen/kWh) | Charged Power Amount (Wh) |
|---|---|
| 48 | 3200 |
| 44 | 2800 |

In Table 3, the maximum value of the power sale price is 48 yen/kWh and the charged power amount (electric power amount) corresponding to the power sale price is 3200 Wh. Therefore, the charged power amount is set at "3200 Wh" in the second power acquiring unit 26b for monitoring the discharged power amount measured by the second electricity meter 12. It is now assumed that only 100 Wh of the electric power charged in the battery 3 is discharged and the unit price of the electric power received from the electrical grid 2 during the discharging time is 20 yen/kWh. The difference between the unit price of the electric power received from the electrical grid 2 and the unit price of the surplus power fed to the electrical grid 2 is 28 yen/kWh (=48 yen−20 yen). Therefore, when 100 Wh of the electric power is discharged, the payable compensation calculated is 2.8 yen/kWh (=28 yen/kWh×0.1 kWh).

In the configuration described above, the first electricity meter 11 and the second electricity meter 12 are provided independently of each other because they have different functions. Alternatively, the first electricity meter 11 and the second electricity meter 12 may be provided within a single housing.

Figure 3A:
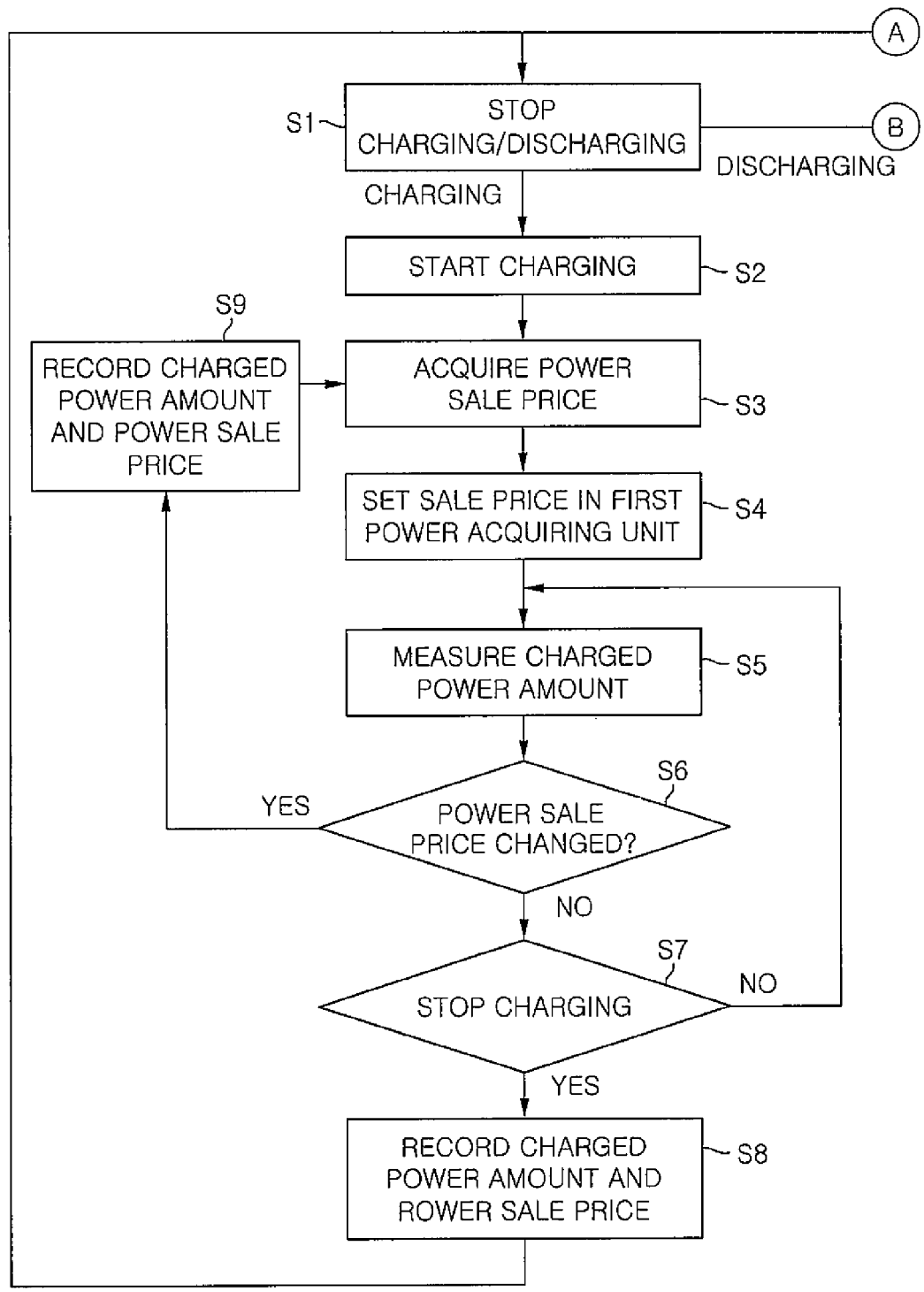
FIGS. 3A and 3B show a flowchart for explaining the operation of the electric power control apparatus in accordance with the embodiment of the present invention.
Figure 3B:
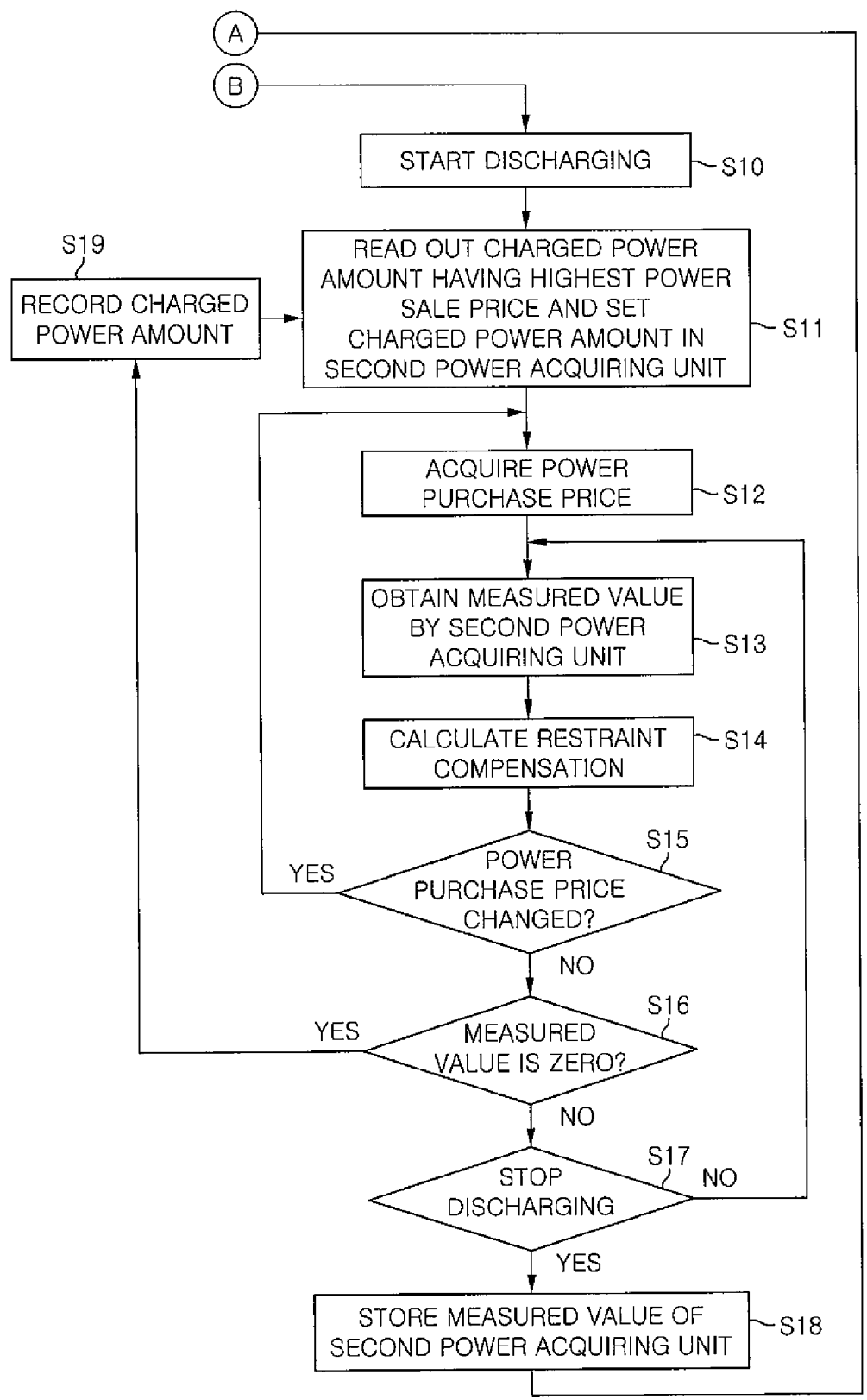

The charging/discharging operation of the battery 3 will be described with reference to FIGS. 3A and 3B. When no electric power is charged to and discharged from the battery 3, the controller 20 turns off the switches SW2 and SW3 to stop a charging/discharging process (S1).

As set forth earlier, the controller 20 performs an operation of charging the battery 3 in a case where it is impossible to reversely feed electric power to the electrical grid 2. When charging the battery 3, the surplus power management unit 22 turns on the switch SW2 to start an operation of charging the battery 3 (S2). At this time, the charging/discharging control unit 23 keeps the switch SW3 turned off and the power sale price acquiring unit 29a acquires power sale price (S3). The power sale price acquired by the power sale price acquiring unit 29a is set in the first power acquiring unit 26a (S4).

Thereafter, the first power acquiring unit 26a measures the charged power amount charged in the battery 3 (S5). If the power sale price is not changed (S6) until the charging operation is stopped (S7), the first power acquiring unit 26a records the charged power amount and the power sale price in the charged power amount storing unit 28 after the charging operation is stopped (S8). On the other hand, if the power sale price is changed (S6) before the charging operation is stopped (S7), the flow returns back to step S3 after the charged power amount and the power sale price are recorded in the charged power amount storing unit (S9). Then, a new power sale price is acquired in step S3. The operations mentioned above are repeated until the charging operation is stopped.

When the battery 3 is discharged, the surplus power management unit 22 turns off the switch SW2. The charging/discharging control unit 23 turns on the switch SW3 to start discharging the electric power from the battery 3 to the distribution board 7 (S10). Then, the information on the charged power amount having the highest power sale price is read out from the charged power amounts recorded in the charged power amount storing unit 28 and the charged power amount thus read is set in the second power acquiring unit 26b (S11). The power purchase price acquiring unit 29b acquires a power purchase price applied when the electric power is discharged from the battery 3 (S12). The second power acquiring unit 26b reads out a discharged power amount of the battery 3 from the second electricity meter 12 and obtains a measured value by subtracting the discharged power amount from the charged power amount (S13).

In this regard, the amount of electric power discharged from the battery 3 is the electric power amount for which profit could have been made if the electric power would have been fed to the electrical grid 2 during the charging time. The amount of electric power discharged from the battery 3 is equal to the electric power amount which would be purchased from the electrical grid 2 during the discharging time if the electric power is not charged. In order to offset the profit which could occur by selling the electric power and loss which would occur by purchasing the electric power, the difference between the power sale price during the charging time and the power purchase price during the discharging time is used as the unit price of the discharged electric power. The value obtained by multiplying the discharged power amount and the difference between the power sale price and the power purchase price is called restraint compensation. In other words, subtraction from the charged power amount is executed and the restraint compensation is calculated (S14).

If the power purchase price is not changed (if "no" in step S15) and if the measured value (the charged power amount) read out by the second power acquiring unit 26b is equal to zero (if "yes" in step S16), the second power acquiring unit 26b deletes the previously-read charged power amount from the charged power amount storing unit 28 (S19) and then reads out the information on the charged power amount having the second highest power sale price (S11). If the power purchase unit price is changed (if "yes" in step S15), a new power purchase unit price is acquired (S12). Then, the operations mentioned above are repeated. Thereafter, if the operation of discharging the electric power from the battery 3 is stopped (S17), the measured value of the second power acquiring unit 26b available at that time is stored in the charged power amount storing unit 28 (S18).

Figure 4A:
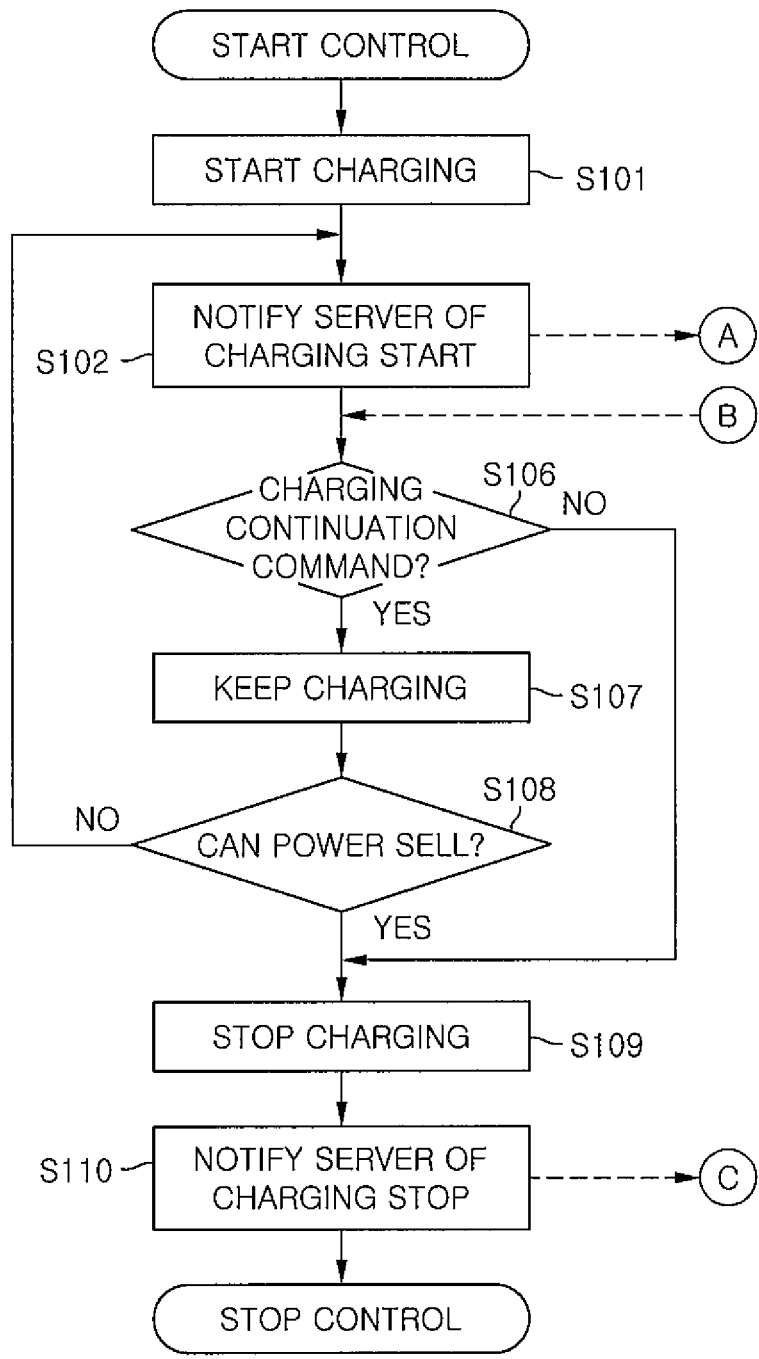
FIGS. 4A to 4C show a flowchart for explaining the operation of the grid connection system in accordance with the embodiment of the present invention.
Figure 4B:
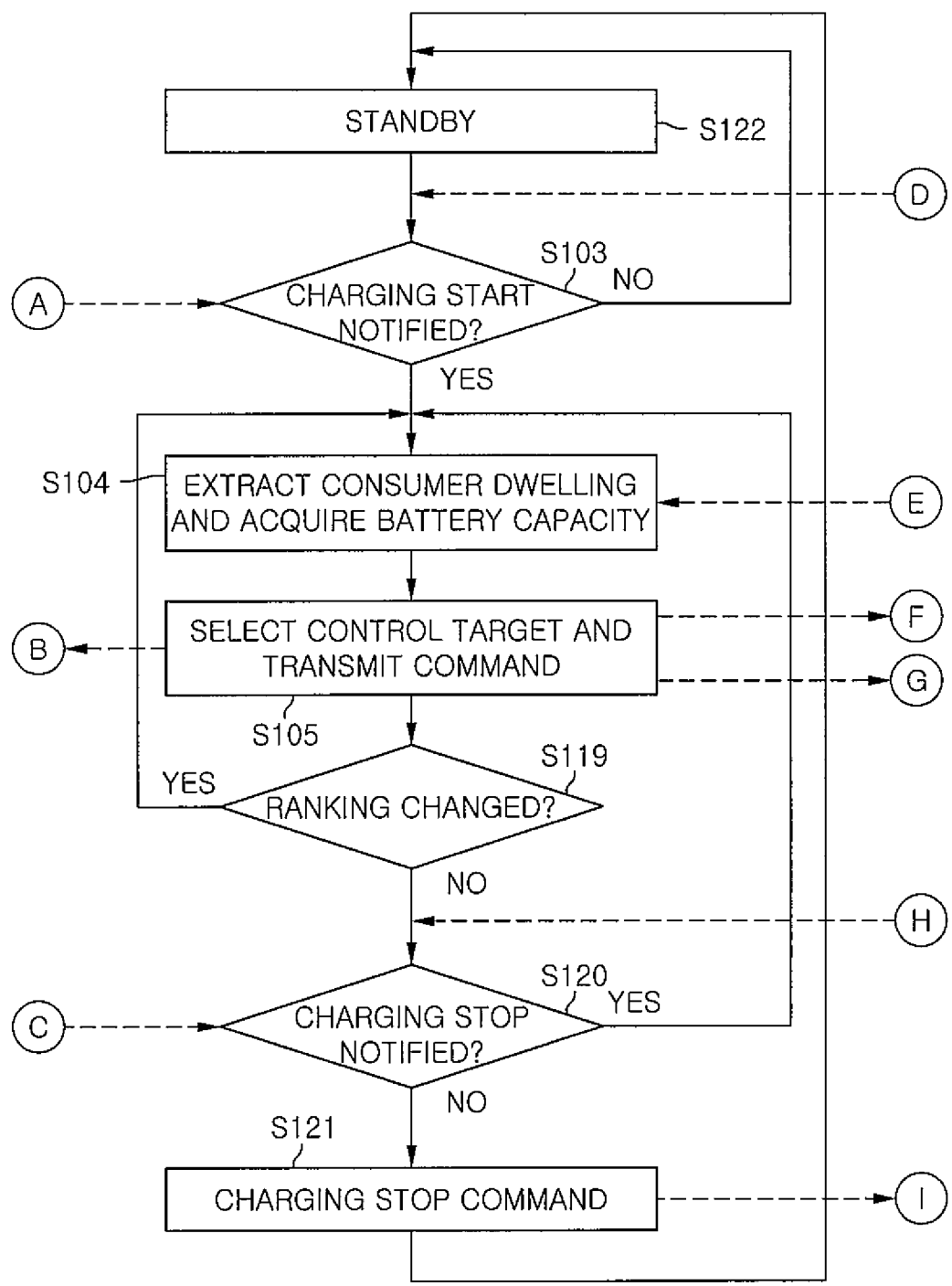
Figure 4C:
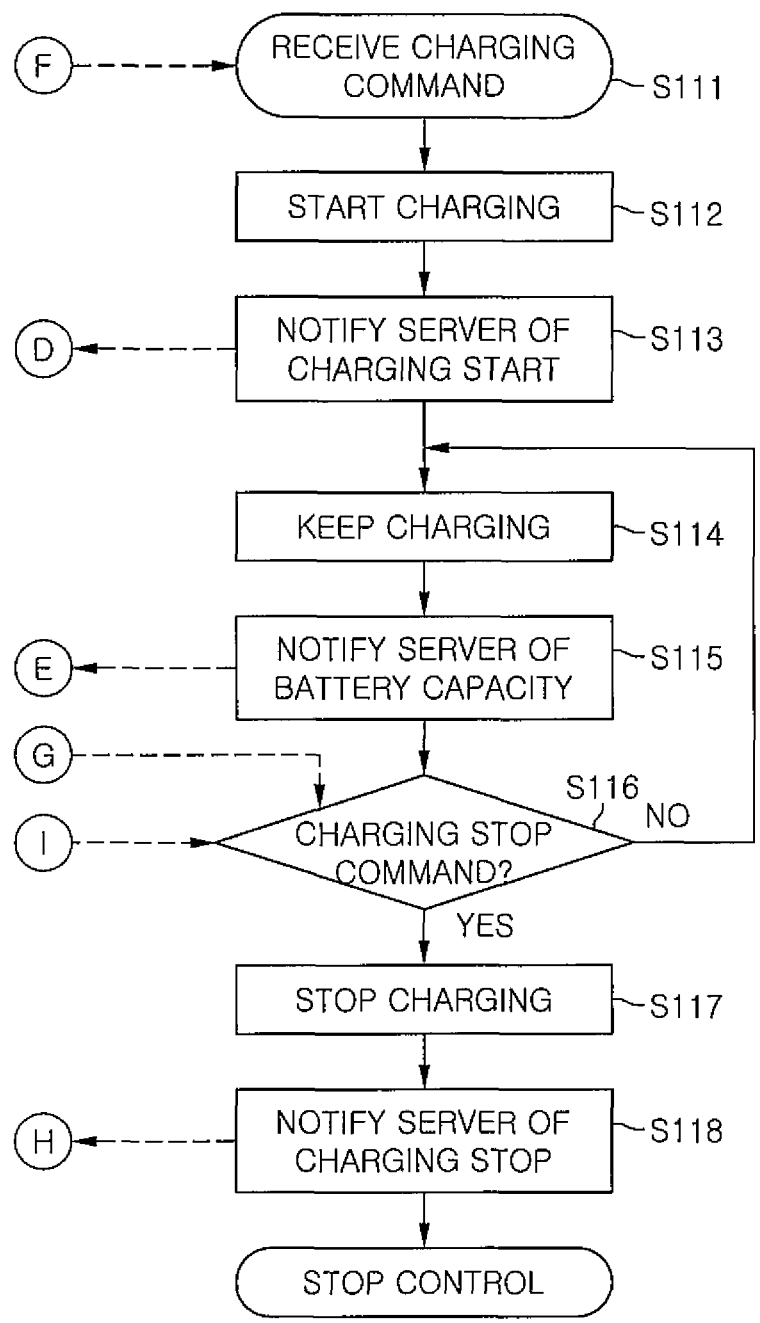

The controller 20 is capable of making communications with the management server 30 through the Internet 32. The controller 20 can acquire the power purchase price and the power sale price from the management server 30 and can perform operations pursuant to the instructions received from the management server 30. FIGS. 4A to 4C show an example in which the management server 30 issues control instructions to the controllers 20 provided in two consumer dwellings 10. The flowchart in FIG. 4B illustrates the operations of the management server 30. The flowcharts in FIGS. 4A and 4C illustrate the operations of the controllers 20 of the respective consumer dwellings 10. Broken lines in FIGS. 4A to 4C indicate the communications made between the controllers 20 and the management server 30 through the Internet 32.

Referring to FIGS. 4A to 4C, if an increase in the voltage of the electrical grid 2 is detected by the consumer dwelling 10, the surplus power begins to be charged in the battery 3 (S101). The controller 20 notifies the management server 30 of the start of the surplus power charging operation through the communications unit 25 (S102). Upon receiving the notification that the operation of charging the surplus power in the battery 3 is started (S103), the management server 30 extracts consumer dwellings 10 connected to the secondary side of the pole transformer 31 to which the consumer dwelling 10 issuing the notification is connected, and acquires the residual power amount of the battery 3 of each of the consumer dwellings 10 (S104).

The management server 30 selects the consumer dwelling 10, the battery 3 of which has the highest residual power amount, from the consumer dwellings 10 other than the consumer dwelling 10 issuing the initial notification. The management server 30 compares the residual power amount of the consumer dwelling 10 issuing the initial notification with the residual power amount of the selected consumer dwelling 10.

Depending on the result of comparison, the management server 30 transmits a charging continuation command, a charging start command or a charging stop command to the consumer dwellings 10 (S105).

If the command received from the management server 30 is a charging continuation command (S106), the consumer dwelling 10 issuing the initial notification continuously performs the operation of charging the surplus power in the battery 3 (S107). If the command received from the management server 30 is not a charging continuation command, the consumer dwelling 10 issuing the initial notification stops the operation of charging the surplus power in the battery 3 (S109). Further, in a case where it becomes possible to reversely feed the surplus power to the electrical grid 2 during the time when the surplus power is charged in the battery 3 (S108), the operation of charging the surplus power in the battery 3 is stopped (S109). Upon stopping the operation of charging the surplus power in the battery 3, the stop of the charging operation is notified to the management server 30 (S110).

In the meantime, if the electric power can be reversely fed to the electrical grid 2, the consumer dwelling 10 selected by the management server 30 is instructed to stop the operation of charging the electric power in the battery 3. If the electric power cannot be reversely fed to the electrical grid 2, the consumer dwelling 10 selected by the management server 30 is instructed to start the operation of charging the electric power in the battery 3 (S105). Upon receiving a charging start command (S111), the consumer dwelling 10 starts to charge the surplus power in the battery 3 (S112) and notifies the management server 30 of the start of the charging operation (S113). The consumer dwelling 10 continuously performs the charging operation (S114) until a charging stop command is issued from the management server (S116). During the charging process, the residual power amount of the battery 3 is notified to the management server 30 in a timely manner (S115).

Upon receiving a charging stop command from the management server 30 (S116), the consumer dwelling 10 selected by the management server 30 stops the charging operation (S117) and notifies the management server 30 of the stop of the charging operation (S118).

If the ranking of the charged power amounts acquired from the respective consumer dwellings 10 is changed (S119), the management server 30 proceeds to step S104 and acquires the consumer dwellings 10 to be controlled and the residual power amounts thereof. In this manner, the consumer dwelling 10 whose battery 3 has a large residual power amount is caused to reversely feed the surplus power to the electrical grid 2. The consumer dwelling 10 whose battery 3 has a relatively small residual power amount is caused to charge the surplus power in the battery 3.

Even if three or more consumer dwellings 10 are connected to the secondary side of the pole transformer 31, the management server 30 performs the aforementioned determination and command transmission. With this control, the consumer dwellings 10 connected to the electrical grid 2 at the secondary side of the pole transformer 31 can charge the surplus power in the battery 3 in the event that the electric power cannot be reversely fed to the electrical grid 2.

In other words, the consumer dwellings 10 performing the reverse power feeding depending on the residual power amounts of the batteries 3 are dispersed. It is therefore possible to reduce the possibility that the reverse power feeding is performed by only one or some of the consumer dwellings 10. Even if the surplus power cannot be reversely fed to the electrical grid 2, each of the consumer dwellings can receive the compensation for the surplus power charged in the battery 3. Therefore, it is possible to restrain the consumer dwellings 10 from failing to receive the compensation for the surplus power. This helps encourage the consumer dwellings 10 to employ the distributed power sources 1.

Instead of the configuration in which the operation of charging the electric power in the battery 3 is started when the voltage of the electrical grid 2 monitored by the voltage detecting unit 21 exceeds the threshold value, it may be possible to use a configuration in which the reverse power feeding to the electrical grid 2 is performed after the battery 3 is fully charged. The instruction to charge the electric power in the battery 3 may be issued from the outside of the controller 20 through communication.

While the present invention employs the configuration in which the power sale price and the power purchase price are recorded in the charged power amount storing unit 28, power charges may be calculated by recording the electric power amount and the date and time and applying the unit price of the recorded date and time to the recorded electric power amount. It is preferred that the compensation payable at the discharging time be calculated only when the power sale price is higher than the power purchase price.

While the unit price payable at the discharging time is set in view of the consumer dwelling 10 and the power supplier, the profit of the consumer dwelling 10 may be set higher to motivate the consumer dwelling 10 to employ the distributed power source 1 provided with the battery 3. On the contrary, the unit price payable at the discharging time may be set in consideration of the charging and discharging loss such that the unit price is not disadvantageous to the power supplier.

While the battery 3 is installed in the building of the consumer dwelling 10 in accordance with the configuration example described above, it is not essential to install the battery 3 in the building of the consumer dwelling 10. Alternatively, the battery 3 may be provided in an electric car or an electric bicycle rather than the building of the consumer dwelling 10. It may also be possible to use in combination the battery 3 provided independently of the building and the battery 3 installed in the building.

In a case where the battery 3 is provided independently of the building, it may be possible to provide a means for calculating the difference between the power purchase price and the power sale price as compensation when the electric power supplied from the distributed power source 1 is charged in the battery 3 through a charging device. Assuming that the electric power received from the electrical grid 2 is charged in the battery 3 provided independently of the building, it is possible to use the electric power supplied in the time zone in which the power purchase price is cheapest. Accordingly, it is possible to calculate the compensation by fixing the power purchase price to the cheapest price when the battery 3 is charged with the electric power supplied from the distributed power source 1.

In the embodiment described above, the switches SW2 and SW3 are provided in the power conditioner 6. The switch SW1 is provided between the distribution board 7 and the electricity meter 11. The switches SW1 and SW2 are turned on and off by the surplus power management unit 22. The charging/discharging control unit 23 is controlled by the overall operation control unit 24, thereby performing the reverse power feeding of the surplus power and the charging/discharging of the battery 3. However, the present invention is not limited thereto. For example, the present invention may be embodied using a conventional power conditioner.

FIG. 5 shows another embodiment in which the electric power control apparatus in accordance with the present invention is applied to a conventional power conditioner. The electric power control apparatus of the present embodiment differs from the electric power control apparatus shown in FIG. 1 in that the switches SW1 through SW4 are omitted. In order to protect the electrical grid by itself, the power conditioner has a function of reducing the output when the grid voltage grows higher. In the present embodiment, therefore, the voltage which is lower than the stop voltage of the power conditioner is used as a threshold value triggering the charging operation.

More specifically, if the grid voltage acquired from a voltage detecting unit 21 through a surplus power management unit 22 is equal to or higher than the threshold value, an overall operation control unit 24 transmits a charging start command to a charging/discharging control unit 23 so that the current value in the reverse power feeding direction can be equal to zero. Moreover, upon receiving a command from a server, the overall operation control unit 24 transmits a charging start command to the charging/discharging control unit 23. On the other hand, if the grid voltage acquired from the voltage detecting unit 21 through the surplus power management unit 22 is lower than the threshold value, the overall operation control unit 24 instructs the battery 3 to discharge the electric power. If the sum of the electric power generated by the solar cell 5 and the electric power discharged from the battery 3 exceeds the electric power consumed in the electrical load 4, the differential power as the surplus power is reversely fed to the electrical grid 2.

As the altitude of the sun is lowered while not performing the reverse power feeding, the electric power generated by the solar cell 5 is reduced. If the generated electric power is less than the load power, the controller causes the battery 3 to start discharging the electric power. The electric power discharged from the battery 3 is set equal to the difference between the generated power amount of the solar cell 5 and the demand of the load power. The sum of the electric power generated by the solar cell 5 and the electric power discharged from the battery 3 is controlled to become equal to the demand of the load power. In a case where the battery 3 can discharge the electric power, the electric power supplied from the electrical grid 2 is not consumed in the electrical load 4. Other points such as calculation and the like are the same as those described above in respect of the electric power control apparatus shown in FIG. 1. Therefore, no description will be made in that regard.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An electric power control apparatus for use in a consumer dwelling provided with a distributed power source and a battery, the apparatus configured to enable a surplus power generated by the distributed power source to be charged in the battery, the apparatus comprising:
    a compensation calculating unit configured to calculate compensation by using a power sale price available when an electric power is charged in the battery and a power purchase price available when the electric power is discharged from the battery,
    wherein the power sale price is a price of an electric power reversely fed to an electrical grid of a commercial power source from the distributed power source.

2. The apparatus of claim 1, further comprising:
    a voltage detecting unit configured to monitor a voltage of the electrical grid of the commercial power source;
    a surplus power management unit configured to select a state in which surplus power is reversely fed to the electrical grid when the voltage of the electrical grid monitored by the voltage detecting unit is equal to or lower than a specified threshold value and to select a state in which the surplus power is not reversely fed to the electrical grid but is charged in the battery when the voltage of the electrical grid monitored by the voltage detecting unit is higher than the specified threshold value, in a case where the surplus power is generated in the distributed power source;
    a first power acquiring unit configured to acquire an electric power amount generated from the distributed power source and charged in the battery;
    a second power acquiring unit configured to acquire an electric power amount discharged from the battery;
    a power sale price acquiring unit configured to acquire a power sale price available when electric power is fed to the electrical grid; and
    a power purchase price acquiring unit configured to acquire a power purchase price available when an electric power is received from the electrical grid, wherein
    the compensation calculating unit is configured to calculate a loss amount incurred by not reversely feeding the surplus power while the surplus power management unit selects the state in which the surplus power is charged in the battery, as a money amount equivalent to compensation for reverse power feeding, by using the electric power amount acquired by the first power acquiring unit during a period in which the voltage of the electrical grid monitored by the voltage detecting unit is higher than the specified threshold value, the power sale price acquired by the power sale price acquiring unit when the electric power is charged in the battery, the electric power amount acquired by the second power acquiring unit and the power purchase price acquired by the power purchase price acquiring unit when the electric power is discharged from the battery.

3. The apparatus of claim 2, wherein the compensation calculating unit is configured to calculate the compensation by using a difference between the power sale price available when electric power is charged in the battery and the power purchase price available when electric power is discharged from the battery, as a unit price of the electric power discharged from the battery.

4. The apparatus of claim 3, wherein the compensation calculating unit is configured to calculate compensation for an electric power amount discharged from the battery, when the power sale price available when electric power is charged in the battery is higher than the power purchase price available when electric power is discharged from the battery.

5. A grid connection system, comprising:
    the electric power control apparatus of claim 2 provided in each of a plurality of consumer dwellings; and
    a management server configured to, when surplus powers are generated in two or more of the consumer dwellings, transmit a command for causing battery charging through a wide area network to a surplus power management unit of one of the two or more consumer dwellings which has the smallest residual power amount of a battery among the two or more consumer dwellings.

6. An electric power control method for use with one or more consumer dwellings each of which is provided with a distributed power source and a battery, the method enabling a surplus power generated by the distributed power source to be charged in the battery, the method comprising:

calculating compensation by using a power sale price available when an electric power is charged in the battery and a power purchase price available when the electric power is discharged from the battery, wherein the power sale price is a price of an electric power reversely fed to an electrical grid of a commercial power source from the distributed power source.

7. The method of claim 6, further comprising, when surplus powers are generated in two or more of the consumer dwellings, transmitting a command for causing battery charging through a wide area network to one of the two or more consumer dwellings which has the smallest residual power amount of a battery among the two or more consumer dwellings.

\* \* \* \* \*